(12) United States Patent
Liu

(10) Patent No.: US 7,376,143 B2
(45) Date of Patent: May 20, 2008

(54) SYSTEMS AND METHODS FOR CONTENTION CONTROL IN WIRELESS NETWORKS

(75) Inventor: Changwen Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 841 days.

(21) Appl. No.: 10/675,879

(22) Filed: Sep. 30, 2003

(65) Prior Publication Data

US 2005/0070317 A1 Mar. 31, 2005

(51) Int. Cl.
*H04L 12/413* (2006.01)
(52) U.S. Cl. ........................ 370/448; 370/459
(58) Field of Classification Search ............. 370/445, 370/448, 310, 447, 252, 253, 458, 459, 235
See application file for complete search history.

(56) References Cited

U.S. PATENT DOCUMENTS

| | | | | |
|---|---|---|---|---|
| 6,285,662 | B1 * | 9/2001 | Watanabe et al. | 370/280 |
| 6,937,591 | B2 * | 8/2005 | Guo et al. | 370/338 |
| 7,027,462 | B2 * | 4/2006 | Benveniste | 370/447 |
| 7,085,284 | B1 * | 8/2006 | Negus | 370/461 |
| 2001/0055312 | A1 * | 12/2001 | Negus | 370/445 |
| 2002/0071448 | A1 * | 6/2002 | Cervello et al. | 370/445 |
| 2004/0004973 | A1 * | 1/2004 | Lee | 370/445 |
| 2004/0136396 | A1 * | 7/2004 | Yonge et al. | 370/445 |
| 2004/0264423 | A1 * | 12/2004 | Ginzburg et al. | 370/338 |

FOREIGN PATENT DOCUMENTS

WO    WO-2005/034437 A1    4/2005

OTHER PUBLICATIONS

"International Search Report for Corresponding PCT Application No. PCT/US2004/031907", (Jan. 17, 2005),3 Pages.

(Continued)

*Primary Examiner*—Ricky Q. Ngo
*Assistant Examiner*—Gary Mui
(74) *Attorney, Agent, or Firm*—Schwegman, Lundberg & Lundberg, P.A.

(57) ABSTRACT

Systems and methods provide for controlling contention in a wireless network device. The systems and methods transmit a packet on a wireless network. If the transmission is not successful, then a contention window parameter is adjusted according to a fast backoff operation. If the packet transmission was successful and the current value of the contention window parameter is less than a threshold value then the contention window parameter is decreased according to a contention avoidance operation. If the packet transmission is successful and the current value of the contention window parameter is greater than the threshold value then the contention window parameter is decreased according to a slow start operation.

40 Claims, 5 Drawing Sheets

OTHER PUBLICATIONS

Aad, I., et al., "Enhancing IEEE 802.1 Performance in Congested Environments", *Annels Des Telecommunications*, 58, Abstract in English,(Mar. 2003),397-416.

IEEE Computer Society, "Part 11: Wireless LAN Medium Access Control (MAC) and Physical Layer (PHY) Specifications", *IEEE Std. 802.11-1997*, (Jun. 26, 1997), 459 pgs.

Kwon, Y., et al., "A Novel MAC Protocol with Fast Collision Resolution for Wireless LANs", *INFOCOM 2003. Twenty-Second Annual Joint Conference of the IEEE Computer and Communications Societies*, vol. 2, (2003),853-862.

Ni, Q., et al., "Modelling and Analysis of Slow CW Decrease for IEEE 802.11 WLAN", *14th IEEE 2003 International Symposium on Personal, Indoor and Mobile Radio Communication proceedings*, 2, (Sep. 7, 2003), 1717-1721.

Wu, H., et al., "IEEE 802.11 Distributed coordination function(DCF): Analysis and Enhancement", *Proceedings of the IEEE International Conference on Communications*, 1, (Apr. 28, 2002),605-609.

Cali, F, "Dynamic tuning of the IEEE 802.11 protocol to achieve a theoretical throughput limit", *IEEE/ACM Transactions on Networking*, 8(6), (Dec. 2000), 785-799.

Chiu, D, "Analysis of the Increase/Decrease Algorithms for Congestion Avoidance in Computer Networks", *Journal of Computer Networks and ISDN*, 17(1), (Jun. 1989), 1-14.

Jacobson, Van, "Congestion Avoidance and Control", *ACM Computer Communication Review, Proceedings of the Sigcomm '88 Symposium in Stanford*, CA, (Nov. 1988), 1-25.

\* cited by examiner

SYSTEMS AND METHODS FOR CONTENTION CONTROL IN WIRELESS NETWORKS

FIELD

The present invention relates generally to wireless network systems, and more particularly to providing contention control in such networks.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2003, Intel Corporation. All Rights Reserved.

BACKGROUND

The use of wireless networking continues to grow at a rapid pace. Wireless networks are attractive for a number of reasons. They are convenient, they allow flexibility and roaming, and can support dynamic environments. Furthermore, they are relatively easy to install when compared with their wired counterparts. In some cases, for example in older buildings, they may be cheaper to deploy. An entire network can be put together in a matter of hours rather than days with no need for wiring or rewiring. In many scenarios, wireless networks can have a lower cost of ownership than their wired counterparts despite the cheaper cost of wired LAN cards.

As wireless networking becomes more popular, the number of network devices participating in wireless networks may increase. This in turn can lead to increased contention for the wireless network resources, in particular the wireless network bandwidth. Contention in a wireless network can be more problematic than in wired networks because it is relatively more expensive to recover from a collision (e.g. two or more nodes attempting to transmit simultaneously) in wireless networks.

In the IEEE 802.11 standard, IEEE std. 802.11-1999, published 1999 and later versions (hereinafter "IEEE 802.11 standard) for the wireless LAN (WLAN), the medium access control (MAC) protocol is the main element that determines the efficiency in sharing the limited communication bandwidth of the wireless channel. The fundamental access method of the IEEE 802.11 MAC is a distributed coordination function (DCF) known as carrier sense multiple access with collision avoidance, or CSMA/CA, a random access CSMA-based collision avoidance scheme. In general and according to the IEEE 802.11 standard, the DCF works as follows:

For a station to transmit, the station first determines whether the wireless medium is idle for greater than or equal to a DIFS (Distributed Interframe Spacing) period, or an EIFS (Extended Interframe Spacing) period. If yes, it will transmit immediately. If the first transmission fails or the medium is not idle, the backoff procedure will be invoked for the station. The station determines a random backoff interval counter by randomly selecting a value from the interval [0, CW]. The backoff interval counter is initialized to the randomly selected value and managed as follows: The counter is decremented for each medium idle time slot that the medium is idle. If the medium is not determined to be busy and the backoff interval counter of the station is decremented to zero, the transmission may proceed.

As can be seen from the above, the contention window determines the idle backoff time slots and packet collisions in each contention cycle. So the selection of the contention window CW can significantly impact the performance of the 802.11 MAC. In the standard 802.11 MAC, the contention window selection generally follows the following two rules:
1) The contention window CW is doubled every time following an unsuccessful attempt to transmit until the maximum contention widow size of $CW_{max}$ for the medium is reached. A retry will be performed by the station for the frame.
2) The contention window CW will be reset to the minimum contention window size $CW_{min}$ for the medium following a successful transmission or when a retry counter reaches its limit.

It has been observed that the throughput performance of the standard IEEE802.11 MAC protocol does not handle highly loaded wireless local networks well. In particular when the number of active stations increases, the system throughput degrades significantly due to the high collision rate detected. As a result, there is a need in the art for the various embodiments of the present invention.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the embodiments of the invention, and it is to be understood that other embodiments may be utilized and that logical, mechanical, electrical and other changes may be made without departing from the scope of the present invention. The following detailed description is, therefore, not to be taken in a limiting sense.

In the Figures, the same reference number is used throughout to refer to an identical component which appears in multiple Figures. Signals and connections may be referred to by the same reference number or label, and the actual meaning will be clear from its use in the context of the description. Further, the same base reference number (e.g. 120) is used in the specification and figures when generically referring to the actions or characteristics of a group of identical components. A numeric index introduced by a decimal point (e.g. 120.1) is used when a specific component among the group of identical components performs an action or has a characteristic.

The detailed description is divided into multiple sections. In the first section the hardware and software operating environment of different embodiments of the invention is described. In the second section methods according to various embodiments of the invention are described.

Operating Environment

Figure 1A:
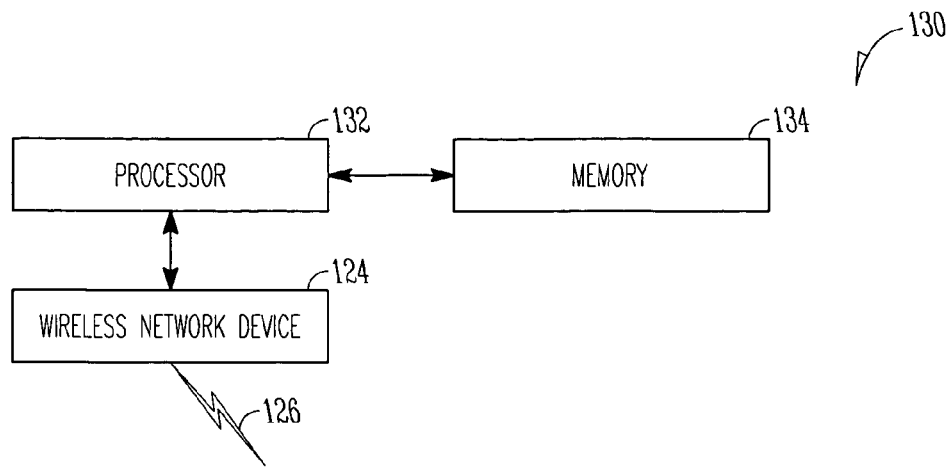
FIGS. 1A and 1B are block diagrams illustrating a system level overview of hardware and software environments incorporating embodiments of the invention.

FIG. 1A is a block diagram of the major components of a hardware environment 130 incorporating various embodiments of the invention. In general, the systems and methods of various embodiments of the invention may be incorporated on any hardware or software system that supports wireless networks. Generally such hardware includes personal computers, server computers, mainframe computers, laptop computers, portable handheld computers, personal digital assistants (PDAs), network enabled cellular telephones, wireless base stations, network interface cards and hybrids of the aforementioned devices. In some embodiments of the invention, hardware environment 130 comprises a processor 132, memory 134 and wireless network interface 124 to wireless network 126. Processor 132, memory 134 and wireless network interface 124 may communicate through a system bus or specialized data transfer bus.

Processor 132 may be any type of computational circuit such as, but not limited to, a microprocessor, a complex instruction set computing (CISC) microprocessor, a reduced instruction set computing (RISC) microprocessor, a very long instruction word (VLIW) microprocessor, a graphics processor, a digital signal processor (DSP), or any other type of processor, processing circuit, execution unit, or computational machine. In some embodiments of the invention, processor 102 may be a processor in the Pentium® or Celeron® family of processors available from Intel Corporation, Santa Clara, Calif. In alternative embodiments, processor 132 may be a specialized network processor. Although only one processor 132 is shown, multiple processors may be included in hardware environment 130.

Memory 132 may comprise any type of volatile or nonvolatile memory capable of storing instructions and data utilized by processor 130. Memory 130 may comprise RAM (Random Access Memory), ROM (Read Only Memory), hard-drives, floppy-drive, CD-ROM, DVD-ROM and flash memory, or any combination thereof.

Wireless network device 124 may be a network interface card, a hardware chip or chipset, or any other hardware designed to send and receive wireless transmissions of data that conform to a wireless protocol. In some embodiments of the invention, the wireless protocol may be any of the IEEE 802.11 family of protocols.

In some embodiments, processor 132, memory 134 and wireless network device 124 may be integrated into a single unit such as a wireless network interface card or the motherboard of a mobile computer such as a laptop computer, notebook computer, PDA etc. In alternative embodiments, processor 132 and memory 134 may be part of integral computer system and wireless network device 124 may be a separate device (having its own processor and memory) removably coupled to the integral computer system via a bus such as a PCI bus or other communications interface such as a USB, PCMCIA or IEEE 1394 (Firewire) interface.

Figure 1B:
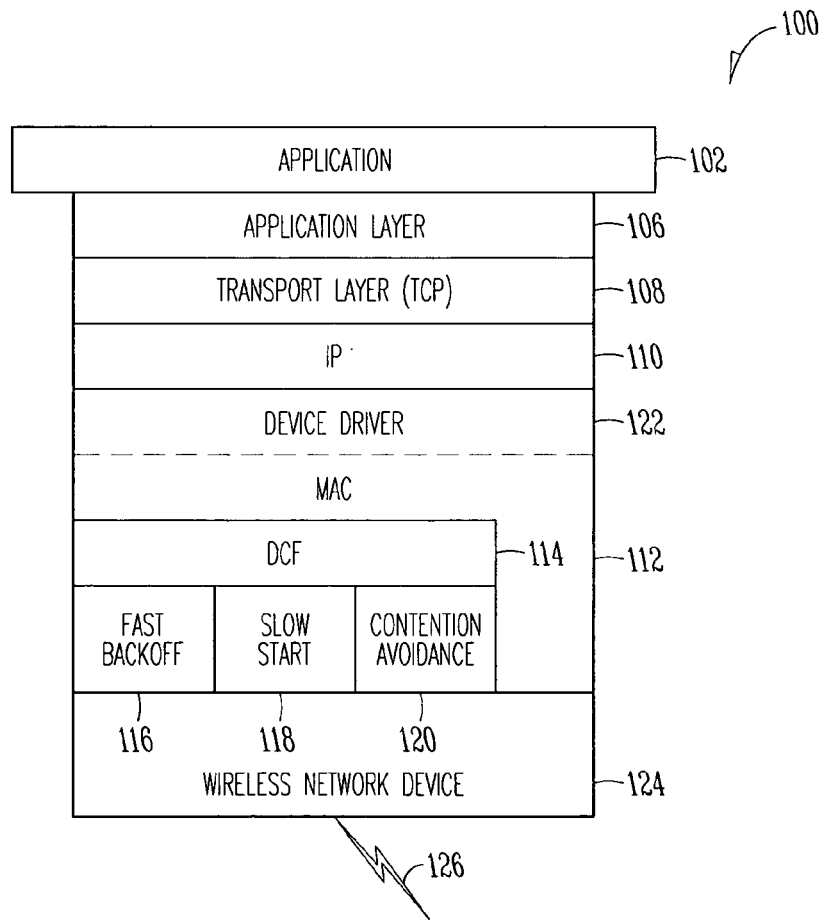

FIG. 1B is a block diagram of the major components of a software operating environment 100 incorporating various embodiments of the invention. In some embodiments of the invention, operating environment 100 comprises a network stack for a wireless network device. The software components running in the operating environment are may be read from a machine-readable media and run under the control of an operating system, and interfaced with the operating system. Examples of such machine-readable media include hard disks, floppy disks, CD-ROMs, DVD-ROMs and flash ROMs. Further, machine-readable media includes wired and wireless signals transmitted over a network. Examples of operating systems include Windows® 95, Windows 98®, Windows Me®, Windows CE®, Windows® NT, Windows 2000®, and Windows XP® by Microsoft Corporation. However, no embodiment of the present invention is limited to any particular operating system, and in alternative embodiments the software components may operate within the Palm OS® from Palm Inc., variants of the UNIX and Linux operating systems and cellular telephone operating systems.

Additionally, the systems and methods of embodiments of the present invention may be implemented in firmware.

As illustrated in FIG. 1B, the network stack includes an application layer 106, transport layer 108, Internet Protocol layer 110, MAC (Media Access Control) layer 112, device driver and device driver layer 122. Application layer 106 provides an interface to network services for a software application 102. Software application 102 may be any software application that uses a network to transmit and receive data to and from hosts on a network. Such applications include electronic mail applications, file transfer applications, and web browser applications. The embodiments of the invention are not limited to any particular software application. Typically application layer 106 provides an interface that is designed to be network independent. That is, application layer 106 is designed so that the interface it provides does not change from network type to another.

Transport layer 108 typically provides an interface to application layer 106, an includes software that manages a virtual error-free, point to point connection so that host A can send messages to host B and they will arrive un-corrupted and in the correct order. The transport layer establishes and dissolves connections between hosts. In one embodiment of the invention, the transport layer is the TCP (Transmission Control Protocol) layer.

Network layer 110 is used by the transport layer 108, and determines routing of packets of message data from sender to receiver via the data link layer. In some embodiments, the network layer protocol is IP (Internet Protocol).

MAC (Media Access and Control) layer 112 provides an interface between the network layer and network functions that depend on the physical media. In some embodiments of the invention, MAC layer 112 comprises an interface for a wireless network 126, and includes a DCF (Distributed Coordination Function) 114 for a wireless network. In some embodiments, the DCF 114 comprises a CSMA/CA (Carrier Sense Multiple Access with Collision Avoidance) DCF. DCF 114 may incorporate one or more of fast backoff 116, slow start 118 and/or contention avoidance 120 functions. Details on these functions are provided below with reference to FIG. 2.

Device driver 122 provides an interface to the MAC layer 112 and the particular physical hardware used to connect a station to the wireless network 126. Some or all of the MAC layer functionality may be implemented in the device driver 122. As is known in the art, device driver 122 makes use of the particular commands and physical interfaces provided by a particular wireless network device 124 used to send and receive data on the wireless network 126. In addition to being hardware dependent, device drivers are typically also operating system dependent.

The network stack illustrated in FIG. 1B is typical of a TCP/IP implementation used in some embodiments of the invention. Those of skill in the art will appreciate that other protocols may be substituted for TCP/IP, and are within the scope of the present invention.

Additionally, those of skill in the art will appreciate that the functionality provided by the layers described above may be distributed across hardware and software in various manners. For example, the DCF functions may be provided within a MAC layer that is provided by an operating system, or they may be provided as part of a network interface card (NIC) that is connected to a host computer or network device. The embodiments of the invention are not limited to any particular distribution of network functionality.

Figure 2:
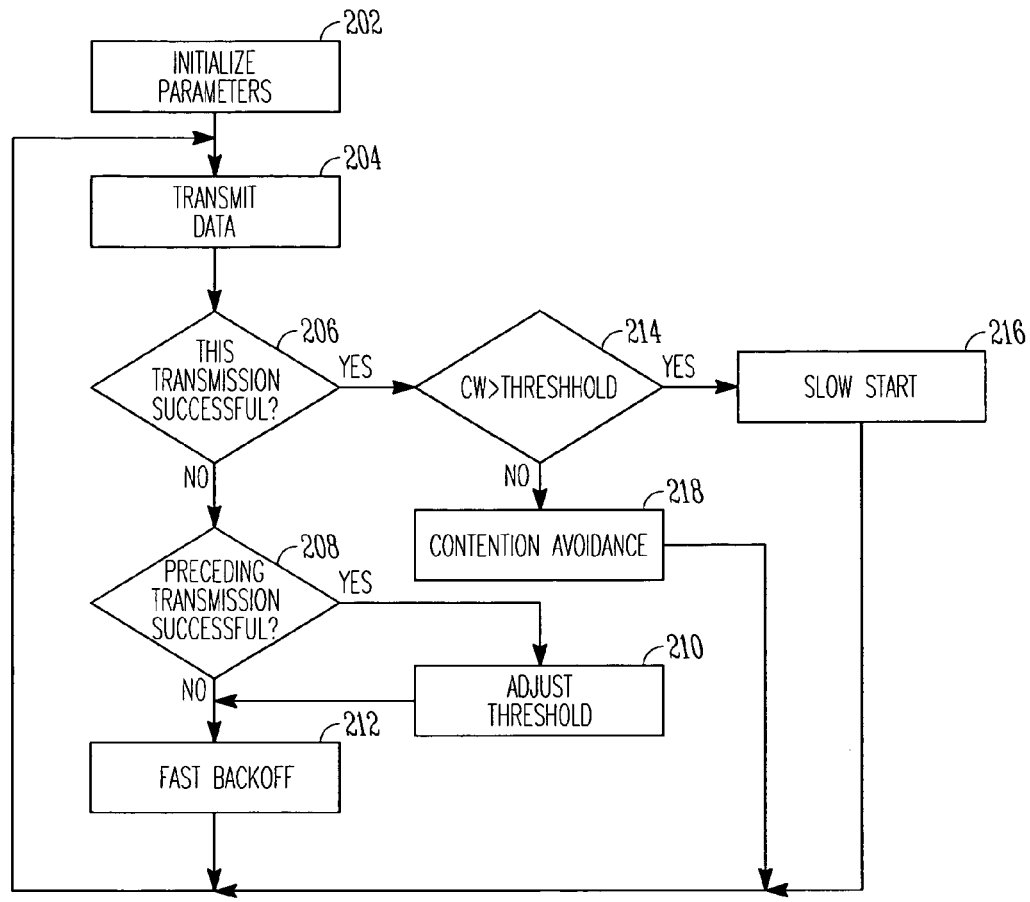
FIG. 2 is a flowchart illustrating a method for controlling contention in a wireless network.

FIG. 2 is a flowchart illustrating methods for controlling contention in a wireless network according to embodiments of the invention. The methods may be performed within an operating environment such as that described above with reference to FIGS. 1A and 1B. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIG. 2 are inclusive of the acts performed by an operating environment executing an exemplary embodiment of the invention.

Methods

FIG. 2 is a flowchart illustrating a method for determining a contention window interval to provide contention control in a wireless network. The method begins when a system executing the method initializes contention control parameters (Block 202). In some embodiments of the invention, the contention control parameters include a contention window value "CW", a threshold value "Threshold", and a success flag "Success". In some embodiments, these parameters may be initially set as follows:

CW=CWmax;
Threshold=CWmin;
Success=false;

where CWmax is a predetermined maximum value for CW, CWmin is a predetermined minimum value for CW, and Success indicates whether the last transmission was successful or not. Values for CWmax and CWmin may be dependent on the underlying wireless protocol being used. In some embodiments of the invention, the Success parameter may be initialized to a true value, resulting in a slightly more conservative method for adjusting the CW parameter.

Next, the system receives a request to transmit data (block 204). The data will typically originate from a software application and may include headers added on by the network layers below the software application. In some embodiments, if the medium is idle for more than the DIFS period or if the backoff interval counter for the station is zero, the system then attempts to transmit the data on the wireless network. Otherwise, the system will invoke a backoff procedure by selecting a backoff time interval counter from the interval [0, CW], decreasing the backoff counter when the medium is not busy, and attempting to transmit the packet when the backoff counter is zero. Assuming the former case: the system attempts to transmit the data on the wireless network.

The system then checks to see if the transmission was successful (block 206). If the transmission was not successful, the system proceeds to determine if the transmission attempt immediately preceding the current transmission attempt was successful by examining the Success parameter (block 208). If the preceding transmission was successful (i.e. Success=1), the threshold value is adjusted upward (block 210) and then reset Success to 0. In some embodiments, the threshold value is doubled until reaching a maximum of CWmax. In alternative embodiments of the invention, fast backoff comprises setting the CW parameter directly to CWmax. The method then proceeds to perform fast backoff on the contention window parameter (block 212).

If the preceding transmission was not successful (i.e. Success=0), the system proceeds directly to performing fast backoff on the CW parameter (block 212) without adjusting the Threshold parameter. In some embodiments of the invention, fast backoff comprises doubling the CW parameter until reaching the value CWmax. In alternative embodiments of the invention, fast backoff comprises setting the CW parameter directly to CWmax.

Pseudocode for the blocks 206-212 according to some embodiments is as follows:

```
Fast Backoff
If ( An unsuccessful transmission happens )
    If (Success == 1)
        Threshold = min(2*CW + 1, CW_max);
        Success = 0;
    Endif
    CW = min(2*CW + 1, CW_max);
Endif
```

Pseudocode for the blocks 206-212 according to alternative embodiments is as follows:

```
Fast Backoff (Alternative Embodiments)
If ( An unsuccessful transmission happens )
    If (Success == 1)
        Threshold = min(2*CW + 1, CW_max);
        Success = 0;
    Endif
    CW = CW_max;
Endif
```

If the check at block 206 determines that the transmission was successful, then the system proceeds to determine if the current CW parameter is greater than the Threshold parameter (block 214). If CW is greater than Threshold, the system performs a slow start function (block 216). In some embodiments, the slow start function comprises substantially halving the CW parameter, to a minimum of CWmin.

Pseudocode for the slow start function of block 216 according to embodiments is as follows:

```
Slow Start
If ( A successful transmission happens and CW > Threshold)
    Success = 1;
    CW = max ((CW−1)/2, CW_min);
Endif
```

Alternatively, if the check at block 214 determines that the value of the current CW parameter is less than or equal to the Threshold parameter, then the system performs a contention avoidance function (block 218). In some embodiments, the contention avoidance function comprises subtracting a decrement step size value "α" from the current CW parameter to until CW is equal to CWmin. In general, the contention avoidance provides a substantially linear reduction in the CW parameter.

Pseudocode for the contention avoidance function used in some embodiments of the invention is as follows:

```
Contention Avoidance
If ( A successful transmission happens and CW ≦ Threshold)
    Success = 1;
    CW = max(CW_min, CW – α);
Endif
```

In some embodiments, α may be determined according to the current value of CW as shown in table 1. In these embodiments, α is determined according to a piecewise constant function to approximate α(CW) as described below.

TABLE 1

Suggested α value set

| CW | 7-63 | 64-127 | 128-255 | 256-511 | 512-1023 |
|---|---|---|---|---|---|
| α | 3 | 6 | 13 | 25 | 50 |

In alternative embodiments of the invention, the value of α may be determined as illustrated in Table 2 below. In these embodiments, α is determined using a higher order approximation of α(CW) as described below.

TABLE 2

Another suggested α value set

| CW | 7-31 | 32-63 | 64-127 | 128-255 | 256-511 | 512-1023 |
|---|---|---|---|---|---|---|
| α | $\frac{CW^2}{10^2}$ | $\frac{CW^2}{16^2}$ | $\frac{CW^2}{25^2}$ | $\frac{CW^2}{50^2}$ | $\frac{CW^2}{75^2}$ | $\frac{CW^2}{100^2}$ |

The α values in tables 1 and 2 may be derived by approximating α(CW) based on the fact that the resource BSS in the IEEE 802.11 standard is the bandwidth by each station. For each station, let $BW_i$ be the bandwidth utilized by the i-th station, and $CW_i$ be its contention window size. Then on average, $$BW_i(t) \approx \frac{c}{CW_i(t) \times aSlotTime}$$

for some constant coefficient c. Thus $BW_i(t+1)=b*BW_i(t)$ for multiplicative factor $b>0 \Rightarrow CW_i(t+1)=CW_i(t)/b$, and $BW_i(t+1)=a+BW_i(t)$ for an additive factor $a>0 \Rightarrow$ $$CW_i(t+1) = \frac{1}{\frac{a \times aSlotTime}{c} + \frac{1}{CW_i(t)}} = \frac{CW_i(t)}{\frac{a \times aSlotTime}{c} \times CW_i(t) + 1}$$

Since $aSlotTime \ll 1$ and $\frac{a \times aSlotTime}{c} \times CW_i(t) = \frac{a}{BW_i(t)} \ll 1 \Rightarrow$ $$CW_i(t+1) = CW_i(t) - a \times CW_i(t) \times \{aSlotTime \times CW_i(t)\}/c +$$
$$CW_i(t) \times O((CW_i(t) \times aSlotTime)^2) =$$
$$CW_i(t) - \frac{a \times aSlotTime}{c} \times CW_i(t)^2 + CW_i(t) \times O((CW_i(t) \times aSlotTime)^2) =$$
$$CW_i(t) - \alpha(CW_i(t)) + CW_i(t) \times O((CW_i(t) \times aSlotTime)^2) \approx$$
$$CW_i(t) - \alpha(CW_i(t)) \text{ where the additive decrement}$$

$$\text{value } \alpha(CW_i(t)) = \frac{a \times aSlotTime}{c} \times CW_i(t)^2$$

Figure 3:
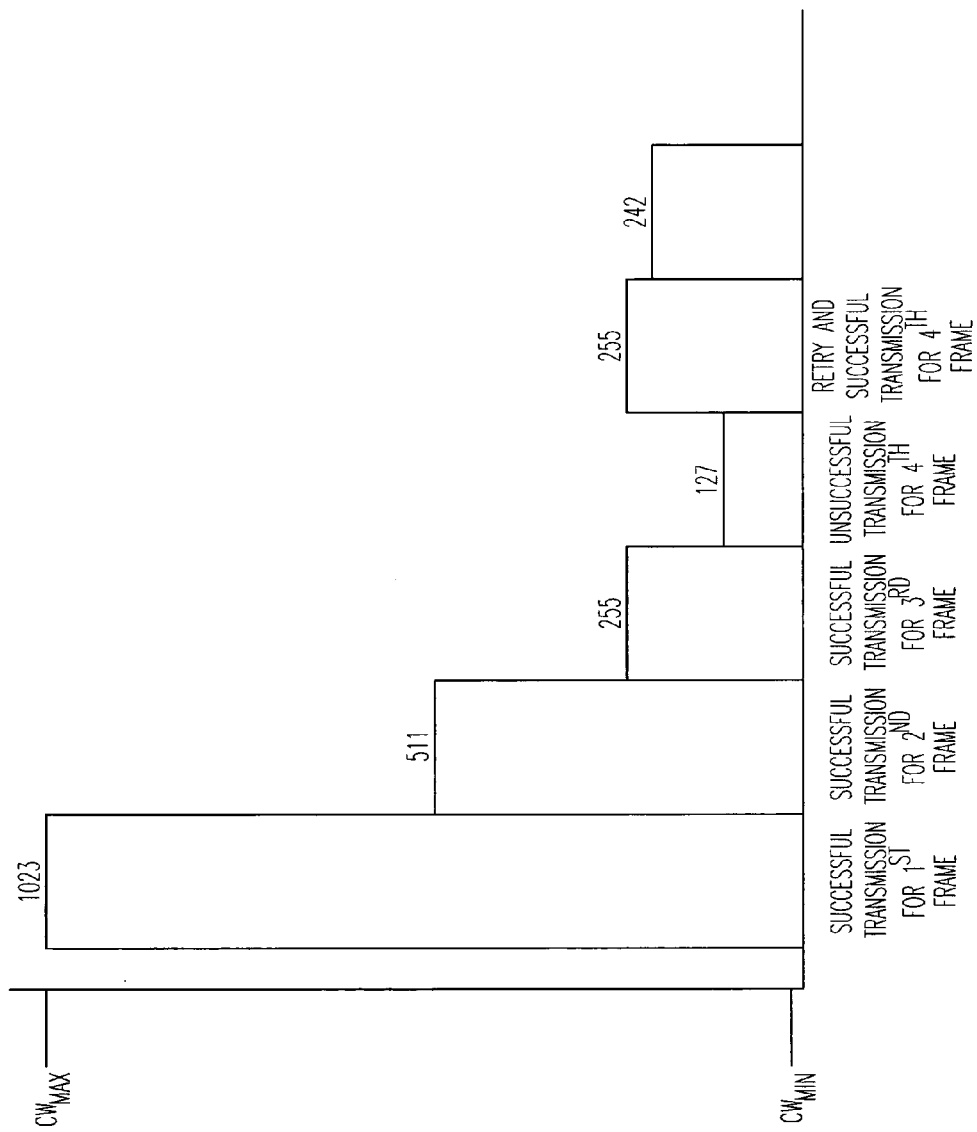
FIG. 3 is a diagram illustrating application of a method according to an embodiment of the invention to an exemplary sequence of wireless packet transmissions.

FIG. 3 is a diagram illustrating an example of the application of a method according to an embodiment of the invention to an exemplary sequence of wireless packet transmissions. The example in FIG. 3 shows the resulting CW parameter values during a sequence of packet transmissions where three packets are transmitted successfully followed by an unsuccessful transmission and a successful retry. As can be seen by the exemplary sequence, with each successful transmission, the methods reduce the contention window size CW either aggressively, e.g. exponential reduction by a slow start function until a threshold value is reached, or gradually, e.g. linear reduction by a contention avoidance function after the threshold value is reached. After an unsuccessful transmission, the contention window size CW may be increased aggressively, e.g. fast backoff by exponential increase or by taking the maximum contention window size. In some embodiments, the threshold is a value not less than the last contention window size in which a successful transmission has happened or the threshold value is the maximum contention windows size CWmax for the medium.

Figure 4A:
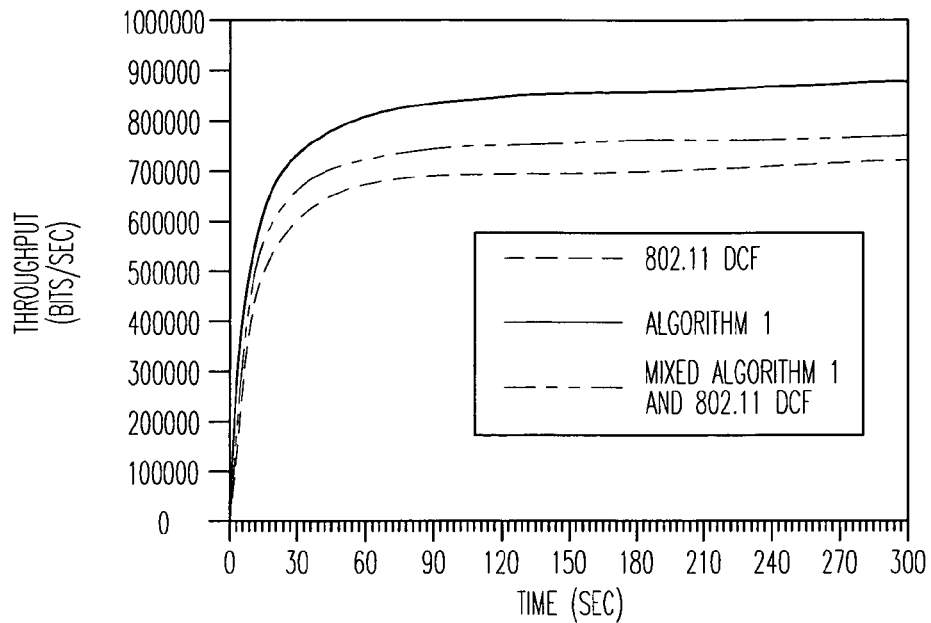
FIGS. 4A-4C are charts illustrating exemplary performance results achieved by an embodiment of the invention.
Figure 4B:
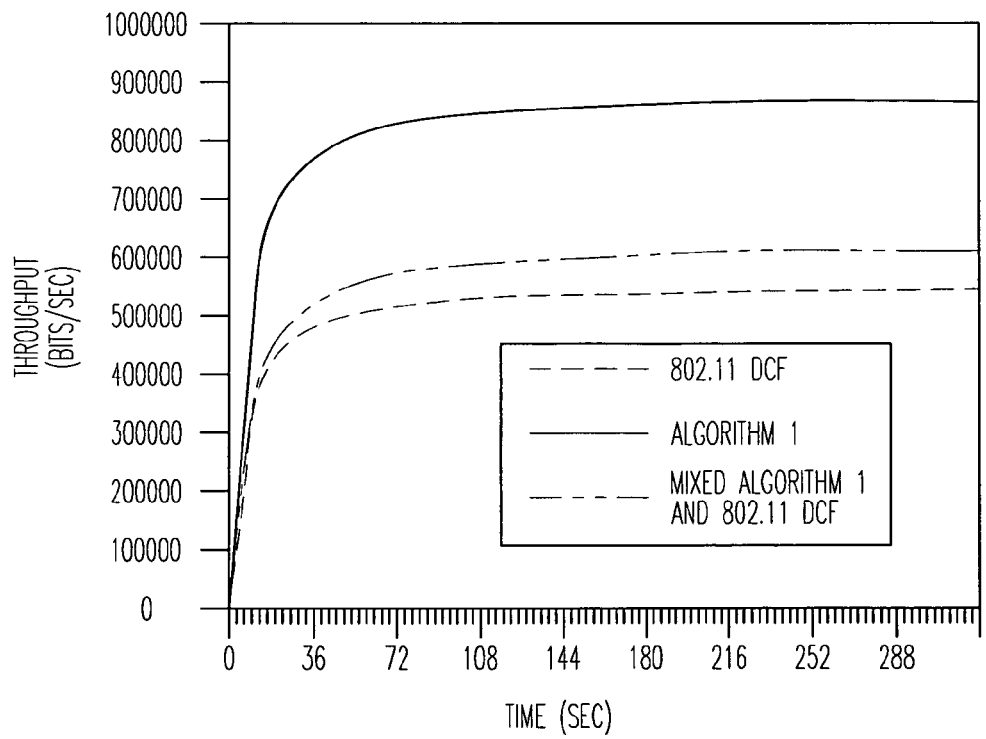
Figure 4C:
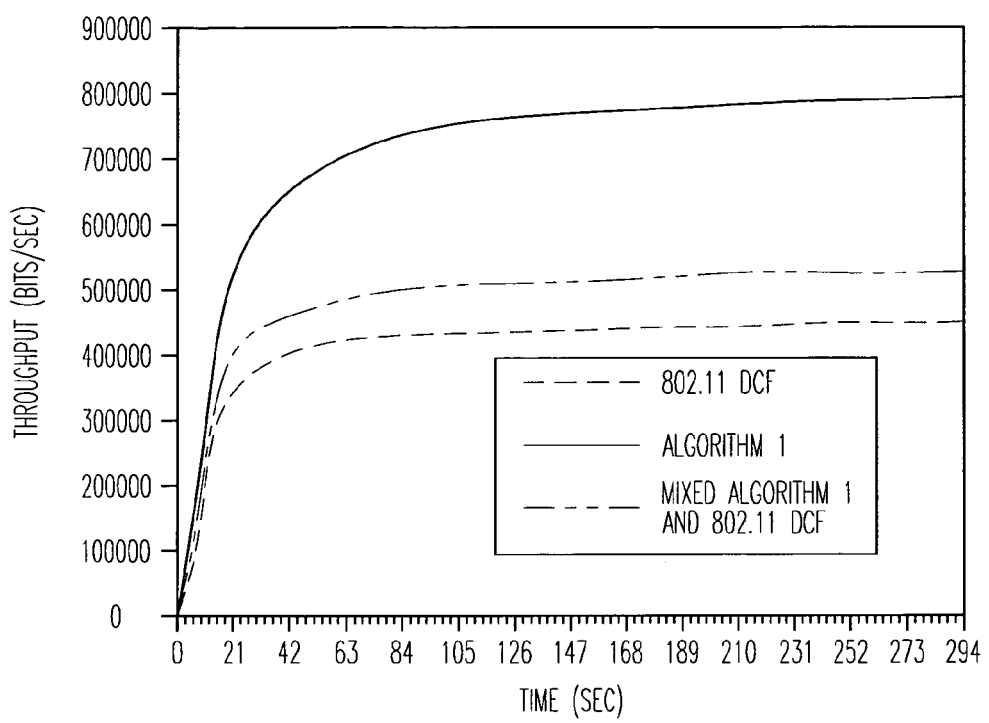

FIGS. 4A-4C are charts illustrating exemplary performance results achieved by embodiments of the invention. The performance results were based on simulation studies using an Opnet simulator from OPNET Technologies, Inc. for the novel contention control methods described above in comparison to and mixed with the standard IEEE 802.11 MAC DCF. The simulations were performed for three wireless LAN scenarios: 10 stations, 50 stations, and 100 stations. For each scenario, three simulation cases were run:

All stations run the standard 802.11 MAC DCF, illustrated as curve 406.

All stations run the novel contention control method with the protocol parameters from table, illustrated as curve 402.

Half of the stations run the novel contention method with the protocol parameters from Table 1 and the other half run the standard 802.11 MAC DCF, referred as the mixed 802.11 DCF and Algorithm 1, illustrated as curve 404.

No RTS/CTS were used in the simulation cases. Table 3 shows the wireless LAN system configuration and the simulation configurations.

TABLE 3

| Parameter | Value |
|---|---|
| SIFS | 28 m sec |
| DIFS | 128 m sec |

TABLE 3-continued

| Parameter | Value |
| --- | --- |
| A slot time | 50 m sec |
| Bit rate | 1 mbps |
| PLCP overhead | 128 m sec |
| CWmin | 15 |
| CWmax | 1023 |
| Parameter | Value |
| Packet size | Uniform distribution between 1400 bytes and 2000 bytes |
| Packet inter arriving time | 10 stations: uniform distribution between 0.01 and 0.02.50 stations: uniform distribution between 0.1 and 0.2.100 stations: uniform distribution between 0.1 and 0.2. |
| Simulation duration | 300 seconds |

In the simulation cases, the traffic is generated so that all stations will always experience busy media when they try to initiate transmissions for new frames and hence will always need to go through backoff procedures to transmit frames.

The performance of a simulated 10 station network is illustrated in FIG. 4A, a simulated 50 station network in FIG. 4B, and a simulated 100 station network in FIG. 4C. It should be noted that the performance levels illustrated in FIGS. 4A-4C are exemplary, and that no embodiment of the invention is limited to the performance values shown.

Systems and methods for providing contention control in a wireless network are provided. The embodiments of the invention provide advantages over previous systems. For example, the systems and methods of the embodiments of the invention may reduce collisions significantly and achieve high system throughput while still maintain the fairness to all stations. Furthermore, the systems and methods can be supported with no changes to TCP/IP and with minimal changes to the IEEE 802.11 MAC standards. The methods can also be applied directly to other contention based medium access protocols, such as IEEE 802.11e EDCF (Enhanced Distributed Coordination Function).

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that the present invention be limited only by the following claims and equivalents thereof.

I claim:

1. A method comprising:
  transmitting a packet on a wireless network;
  if transmitting the packet is not successful, then performing the tasks of:
    setting a contention window parameter according to a fast backoff operation, and
    if transmitting a preceding packet is not successful then increasing a threshold value;
  if transmitting the packet is successful and the current value of the contention window parameter is less than the threshold value then decreasing the contention window parameter according to a contention avoidance operation; and
  if transmitting the packet is successful and the current value of the contention window parameter is greater than the threshold value then decreasing the contention window parameter according to a slow start operation.

2. The method of claim 1, wherein the fast backoff operation comprises increasing the contention window parameter in an exponential manner.

3. The method of claim 2, wherein the fast backoff operation comprises substantially doubling the contention window parameter.

4. The method of claim 1 wherein the fast backoff operation comprises setting the contention window parameter to a predetermined maximum value.

5. The method of claim 1, wherein the contention avoidance operation decreases the contention window parameter in a substantially linear manner.

6. The method of claim 1, wherein the contention avoidance operation subtracts a predetermined stepsize value from the contention window parameter.

7. The method of claim 6, wherein the stepsize value is determined according to the contention window parameter.

8. The method of claim 1, wherein the slow start operation decreases the contention window parameter in a substantially exponential manner.

9. The method of claim 1, wherein the slow start operation substantially halves the contention window parameter.

10. The method of claim 1, further comprising setting the contention window parameter to a predetermined maximum value prior to transmitting any packets.

11. A network device comprising:
  a processor;
  a memory coupled to the processor;
  a wireless network interface coupled to the processor;
  wherein the processor is operable to cause the network interface to:
  transmit a packet on a wireless network,
  if the packet is not successfully transmitted, then performing the tasks of:
    setting a contention window parameter according to a fast backoff operation, and
    if transmitting a preceding packet is not successful then increasing a threshold value,
  if the packet is successfully transmitted and the current value of the contention window parameter is less than the threshold value then decreasing the contention window parameter according to a contention avoidance operation, and
  if transmitting the packet is successful and the current value of the contention window parameter is greater than the threshold value then decreasing the contention window parameter according to a slow start operation.

12. The network device of claim 11, wherein the fast backoff operation comprises increasing the contention window parameter in an exponential manner.

13. The network device of claim 12, wherein the fast backoff operation comprises substantially doubling the contention window parameter.

14. The network device of claim 11 wherein the fast backoff operation comprises setting the contention window parameter to a predetermined maximum value.

15. The network device of claim 11, wherein the contention avoidance operation decreases the contention window parameter in a substantially linear manner.

16. The network device of claim 11, wherein the contention avoidance operation subtracts a predetermined stepsize value from the contention window parameter.

17. The network device of claim 14, wherein the stepsize value is determined according to the current contention window parameter.

18. The network device of claim 11, wherein the slow start operation decrease the contention window parameter in a substantially exponential manner.

19. The network device of claim 11, wherein the slow start operation substantially halves the contention window parameter value.

20. The network device of claim 11, further comprising setting the contention window parameter to a predetermined maximum value prior to transmitting any packets.

21. The network device of claim 11, wherein the processor, memory and wireless network interface are incorporated in a network interface card.

22. The network device of claim 11, wherein the processor, memory and wireless network interface are incorporated in a wireless base station.

23. The network device of claim 11, wherein the processor, memory and wireless network interface are incorporated in a personal digital assistant.

24. The network device of claim 11, wherein the processor, memory and wireless network interface are incorporated in a personal computer.

25. The network device of claim 11, wherein the processor, memory and wireless network interface are incorporated in a server computer.

26. The network device of claim 11, wherein the wireless network interface is an interface to network conforming to an IEEE 802.11 protocol.

27. A computer-readable storage medium having computer executable instructions for causing one or more processors to perform a method for controlling contention in a wireless network device, the method comprising:
   transmitting a packet on a wireless network;
   if transmitting the packet is not successful, then performing the tasks of:
      setting a contention window parameter according to a fast backoff operation, and
      if transmitting a preceding packet is not successful then increasing a threshold value;
   if transmitting the packet is successful and the current value of the contention window parameter is less than the threshold value then decreasing the contention window parameter according to a contention avoidance operation; and
   if transmitting the packet is successful and the current value of the contention window parameter is greater than the threshold value then decreasing the contention window parameter according to a slow start operation.

28. The computer-readable medium of claim 27, wherein the fast backoff operation comprises increasing the contention window parameter in an exponential manner.

29. The computer-readable medium of claim 28, wherein the fast backoff operation comprises substantially doubling the contention window parameter.

30. The computer-readable medium of claim 27 wherein the fast backoff operation comprises setting the contention window parameter to a predetermined maximum value.

31. The computer-readable medium of claim 27, wherein the contention avoidance operation decreases the contention window parameter in a substantially linear manner.

32. The computer-readable medium of claim 27, wherein the contention avoidance operation subtracts a predetermined stepsize value from the contention window parameter.

33. The computer-readable medium of claim 32, wherein the stepsize value is determined according to the contention window parameter.

34. The computer-readable medium of claim 27, wherein the slow start operation decreases the contention window parameter in a substantially exponential manner.

35. The computer-readable medium of claim 27, wherein the slow start operation substantially halves the contention window parameter.

36. The computer-readable medium of claim 27, further comprising setting the contention window parameter to a predetermined maximum value prior to transmitting any packets.

37. A system comprising:
   a media access and control module;
   a distributed coordination function module coupled to the media access and control module operable to:
   transmit a packet on a wireless network,
   if the packet is not successfully transmitted, then performing the tasks of
      setting a contention window parameter according to a fast backoff operation, and
      if transmitting a preceding packet is not successful then increasing a threshold value,
   if the packet is successfully transmitted and the current value of the contention window parameter is less than the threshold value then decreasing the contention window parameter according to a contention avoidance operation, and
   if transmitting the packet is successful and the current value of the contention window parameter is greater than the threshold value then decreasing the contention window parameter according to a slow start operation.

38. The system of claim 37, wherein the fast backoff operation comprises increasing the contention window parameter in an exponential manner.

39. The system of claim 37, wherein the contention avoidance operation decreases the contention window parameter in a substantially linear manner.

40. The system of claim 37, wherein the slow start operation decrease the contention window parameter in a substantially exponential manner.

* * * * *

UNITED STATES PATENT AND TRADEMARK OFFICE
CERTIFICATE OF CORRECTION

PATENT NO. : 7,376,143 B2
APPLICATION NO. : 10/675879
DATED : May 20, 2008
INVENTOR(S) : Liu

It is certified that error appears in the above-identified patent and that said Letters Patent is hereby corrected as shown below:

On the title page, item (74), in "Attorney, Agent, or Firm", in column 2, line 2, delete "Lundberg," and insert -- Woessner, --, therefor.

In column 12, line 31, in Claim 37, after "of" insert -- : --.

Signed and Sealed this

Eleventh Day of November, 2008

JON W. DUDAS
*Director of the United States Patent and Trademark Office*